(12) United States Patent
Vanhove et al.

(10) Patent No.: US 8,229,887 B2
(45) Date of Patent: Jul. 24, 2012

(54) METHOD OF INTEGRATING IN REAL TIME LARGE VOLUMES OF UPDATES IN A DATABASE

(75) Inventors: Nathalie Vanhove, Le Tignet (FR); Rudy Daniello, Nice (FR); Brigitte Ruscica, Grasse (FR); Guy Miralles, Seillans (FR); Pierre Lemaire, Saint Laurent du Var (FR)

(73) Assignee: Amadeus s.a.s., Biot (FR)

( * ) Notice: Subject to any disclaimer, the term of this patent is extended or adjusted under 35 U.S.C. 154(b) by 575 days.

(21) Appl. No.: 12/269,326

(22) Filed: Nov. 12, 2008

(65) Prior Publication Data

US 2010/0114830 A1 May 6, 2010

(30) Foreign Application Priority Data

Nov. 6, 2008 (EP) .................................... 08305779

(51) Int. Cl.
*G06F 17/30* (2006.01)
(52) U.S. Cl. ........................ 707/615; 707/736
(58) Field of Classification Search .................. 707/615, 707/736
See application file for complete search history.

(56) References Cited

U.S. PATENT DOCUMENTS

| 6,397,228 | B1 * | 5/2002 | Lamburt et al. | 707/692 |
| 6,477,510 | B1 * | 11/2002 | Johnson | 705/30 |
| 6,496,843 | B1 * | 12/2002 | Getchius et al. | 715/210 |
| 2004/0107125 | A1 * | 6/2004 | Guheen et al. | 705/7 |
| 2006/0041544 | A1 * | 2/2006 | Santosuosso | 707/4 |

* cited by examiner

*Primary Examiner* — Hosain Alam
*Assistant Examiner* — Johnese Johnson
(74) *Attorney, Agent, or Firm* — Young & Thompson

(57) ABSTRACT

A method of integrating large volumes of updates in a database system. Each individual update includes of a coherent set of data records supplied by a data provider. The database system includes a master file repository and an active image repository. The method includes first obtaining for each individual update a unique modification identifier from a logistic table of the database system. The master file repository is then updated with the coherent set of data records of each uniquely identified individual update. A unique commit identifier is further obtained from the logistic table for each individual update that has been committed by the master file. The active image repository is synchronized by successively loading into the active image each individual update. Completion of the propagation of each individual update into the active image repository is achieved when the loading of each corresponding set of data records is committed by the active image.

5 Claims, 9 Drawing Sheets

Prior Art

METHOD OF INTEGRATING IN REAL TIME LARGE VOLUMES OF UPDATES IN A DATABASE

FIELD OF THE INVENTION

The present invention relates generally to the management of databases and more specifically to a method of accommodating in real-time large numbers of updates brought to a database while it is operational and used to serve numerous end-users.

BACKGROUND OF THE INVENTION

Since they were introduced and started to be largely adopted in the 70's databases have proliferated in all sorts of domains including engineering, scientific, commercial and business applications. Their size can be anything ranging from a small database used by a single individual on a personal computer, e.g., to keep track of personal finances, to large and very large databases set up by various institutions, companies and commercial organizations to support their activity. In an all-interconnected world those large databases are also generally, if not always, made accessible to numerous remotely located end-users to query whatever information is made available by the databases.

In the airline industry, examples of such very-large databases are the ones that hold the airline fares along with the rules restricting their use. Fare databases are mainly set up by a few worldwide global distribution systems (GDSs) that provide travel services to all the actors of the travel industry including the traditional travel agencies and all sorts of other online travel service providers. Such a GDS is for example AMADEUS, a European travel service provider with headquarters in Madrid, Spain.

Those large databases have to sustain conflicting requirements. They must be operational in a 24-hour-a-day/7-day-a-week mode to sustain a worldwide business that never sleeps while they also need to constantly acquire new fares published by hundreds of large and smaller airline companies. As depicted in FIG. 1 the data providers (120), i.e., the airlines or the fare providers on behalf of the airlines, and the data requesters, i.e., the remote end-users of the database (100) are both trying to access simultaneously the same resource creating conflicts to answer queries while database contents are being updated.

Solutions that have been implemented to get around this problem include working in batch mode. That is, in one way or another, all received updates are prepared and accumulated until the database is disabled for end-users at regular intervals (e.g., each night or at scheduled intervals) to let administrators imbed all accumulated updates after which database is re-enabled and can resume answering end-user requests. This obviously however fail complying with the objective of sustaining a 24/7 mode of operation.

An alternative solution that has also been carried out is to implement a flip/flop mechanism. Two identical databases are maintained one serving to answer end-user queries while the other one is being updated. Like with the batch mode, at scheduled intervals, the roles of the databases are swapped. The obvious advantage of this solution is that there is no longer any down time for the end-users (or very little, while swapping takes place). However, none of these solutions allow propagating the incoming updates in real-time. The end-users will see the modifications only after, sometime, a long delay. Delay which essentially depends on the time interval set for the batch or flip/flop mode.

It is therefore the prime object of the invention to disclose a mechanism that allows a continuous integration of the updates received from the data providers and their propagation so that they are coherently and rapidly made available to answer queries from the end-users of the database.

Further objects, features and advantages of the present invention will become apparent to the ones skilled in the art upon examination of the following description in reference to the accompanying drawings. It is intended that any additional advantages be incorporated herein.

SUMMARY OF THE INVENTION

The invention fulfills the above objects of the invention by providing a method of integrating large volumes of updates in a database. Each individual update is comprised of a coherent set of data records supplied by a data provider. The database system includes a master file repository and an active image repository. The method comprises the steps of first obtaining for each individual update a unique modification identifier from a logistic table of the dual-repository database. The master file repository is then updated with the coherent set of data records of each uniquely identified individual update. A unique commit identifier is further obtained from the logistic table for each individual update that has been committed by the master file. The active image repository is synchronized by successively loading into the active image, in the order specified by the commit identifier, each individual update. Synchronization includes retrieving from the master file repository the coherent set of data records of each uniquely identified individual update. Finally, completion of the propagation of each individual update into the active image repository is achieved when the loading of each corresponding set of data records is committed by the active image.

Since the invention allows updates to be continuously integrated into the master file repository and propagated without delay into the active image, they are made available to the end-users of the database in real-time. Hence, end-users can start querying the updates as soon as they are committed by the active image repository while data providers possibly keep updating the master file with further updates that will be in turn soon propagated.

The invention also includes the following features:

The coherent set of data records of each individual update is stored in the master file repository in the form of one or more MF keys each comprising a meaningful minimum set of data which, in combination, serve to build the coherent set of data records.

The individual updates are loaded and stored in the active image (AI) repository in one more AI keys each comprising a meaningful minimum set of data for the end-users of the dual repository database.

One AI key comprises one or more MF keys.

The commit identifiers are attributed by the logistic table in the exact same order as the individual updates have been committed by the master file repository.

Alternatively, the commit identifiers are attributed by the logistic table on a priority basis. Priority is given, e.g., to fast-executing individual updates.

The invention also describes a database system including a first and a second repository wherein the first repository is arranged to receive updates from data providers and wherein the second repository is arranged to answer queries issued by end-users of the database system, the system comprising: a logistic table, the logistic table further including:

means for generating modification identifiers, wherein the modification identifiers are used to uniquely identified each individual update in the first repository;

means for generating commit identifiers, wherein the commit identifiers are used to control the loading of the updates into the second repository. Furthermore, the first repository of the database system is organized by MF key and the second repository is organized by AI key.

The invention also includes a computer program product stored on a computer readable storage medium, comprising computer readable code means for causing at least one computer to operate the above method of integrating large volumes of updates in a database system.

BRIEF DESCRIPTION OF THE DRAWINGS

FIGS. 5a to 5l are detailed examples used to illustrate the mode of operation of the database system.

DETAILED DESCRIPTION

The following detailed description of the invention refers to the accompanying drawings. While the description includes exemplary embodiments, other embodiments are possible, and changes may be made to the embodiments described without departing from the spirit and scope of the invention.

Figure 1:
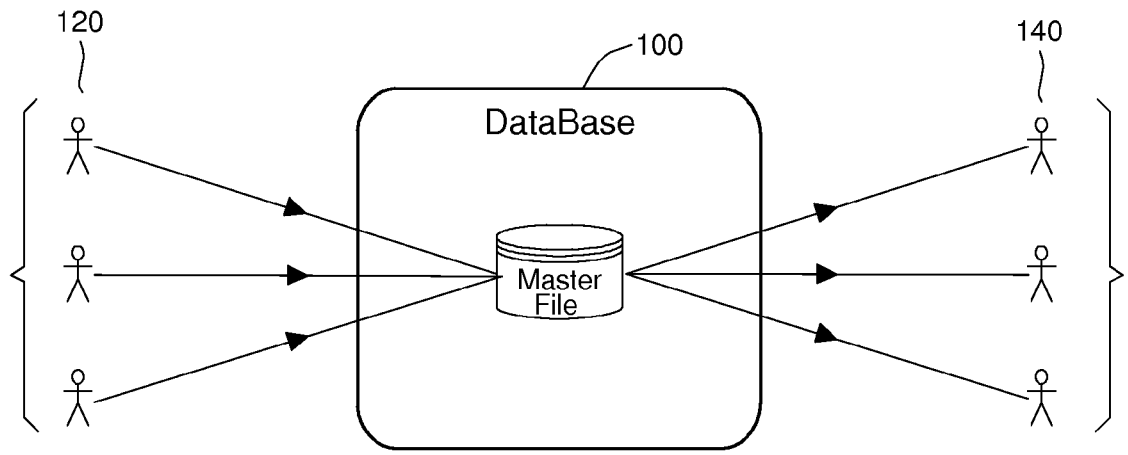
FIG. 1 shows a single-repository database of the prior art that must sustain a continuous acquisition of large volumes of data while attempting to simultaneously serve numerous end-users.
Figure 2:
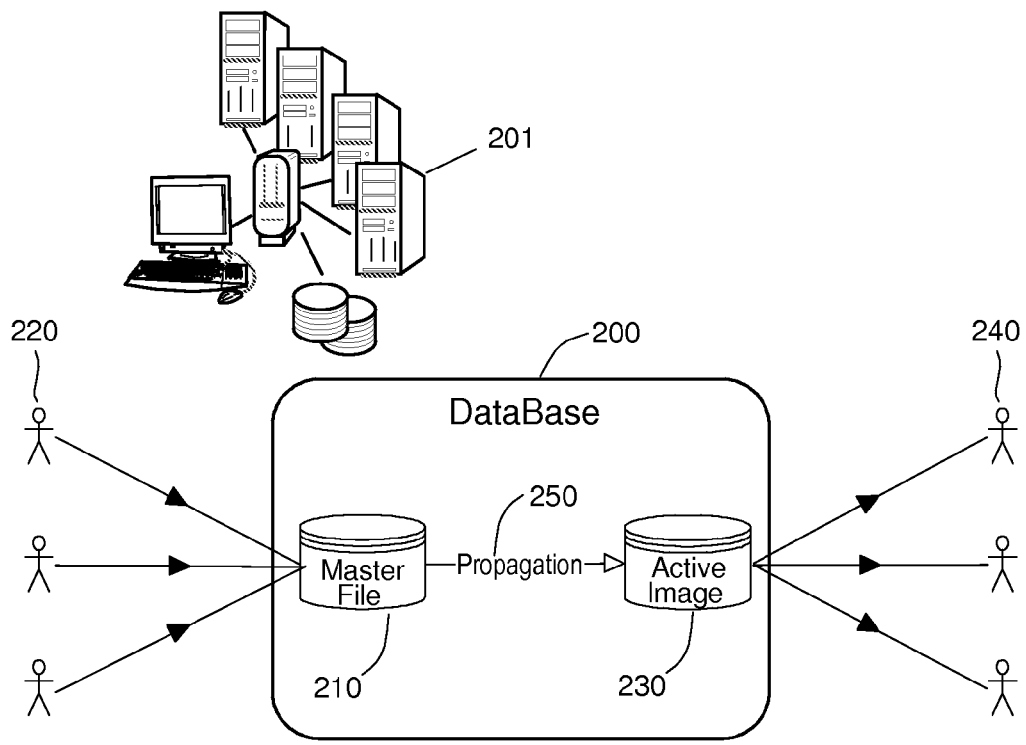
FIG. 2 depicts the model of a database system according to the invention in its computerized environment.

FIG. 2 depicts the database model of the invention (200) which includes a dual repository. Consequently, the database system of the invention is also designated dual-repository database. One repository is optimized for the updating of data contents while the other one is designed to expedite the retrieval of data.

The master file or MF (210) is the container that is updated by data suppliers (220). In the exemplary context chosen to describe the invention, i.e., the airline industry and the large databases of fares maintained by various GDS's, a data supplier may be a provider of fares such as the airline tariff publishing company (ATPCO), an organization owned by a number of domestic and international airlines that collects and distributes the latest airfares of many airlines around the world on a multi-daily basis. Fares, and their application rules, provided by airlines and coded by ATPCO, are electronically transmitted for being automatically incorporated into the GDS fare databases. Another provider of fares can be an administrator or operator of the database authorized to file fares directly into the database generally through a dedicated graphic user interface (GUI) and the corresponding input application.

Whichever the sources from which data are supplied MF repository (210) is designed to facilitate data update and follow up of the changes. To this end it also contains the history of all the modifications brought to the master file.

The active image or AI (230) is the repository designed to facilitate data retrieval in response to the incoming requests issued by end-users of the database (240). For the airline industry and fare databases, end-users are the software applications that implement an ever growing number of online travel sites and providers of online travel services along with the regular travel agencies supported by the GDS's.

The chief objective of the database model of the invention is to allow a controlled and very fast propagation of high volumes of data (250) from the data suppliers (220) to the data requesters so that the end-users of the database (240) can take advantage of the changes and new offerings as soon as they are made available.

As other databases the database system of the invention is implemented as part of a computerized system including at least one computer with sufficient internal and external storing facilities (201) and processing resources to hold and operate the kind of large databases more specifically considered by the invention.

Figure 3:
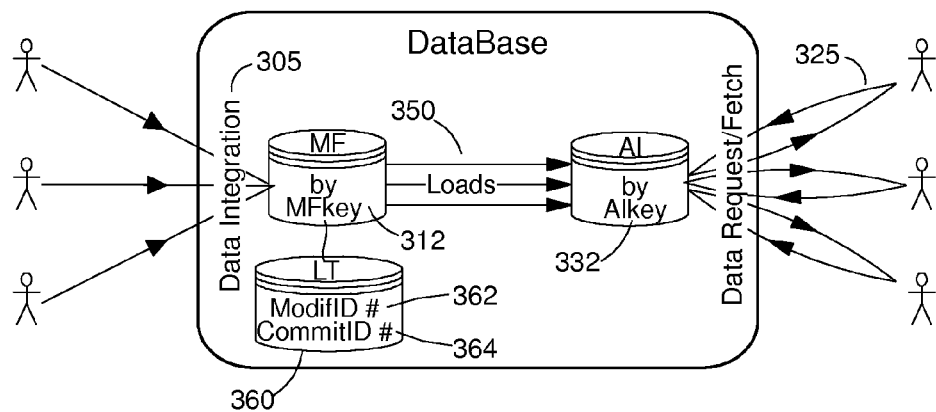
FIG. 3 shows details of the database system model including a master file (MF) repository organized by MFkey, also containing a logistic table, and an active image (AI) repository organized by AIkey.

FIG. 3 shows details of the dual-repository database model.

The integration of new data into the master file (305) must be done on a coherent set of data records. This is achieved by attributing to each set a modification identifier called 'ModifID' (362) represented by a unique number. Thus, the system of the invention can support concurrent updates of the MF since each update is uniquely identified by a ModifID The synchronization of the two repositories (MF and AI) is controlled with the help of a commit Identifier called 'CommitID' (364) also represented by a unique number. The role of the CommitID is to manage the ordered loading (350) of the updates (referred to as data propagation in FIG. 2) from the MF into the AI. Each integration process gets its "CommitID" at the commit time, i.e., when a coherent set of data records has been actually entered by one the data suppliers discussed in FIG. 2 and complete a transaction into the MF. Thus the invention allows implementing multi-instance of load process. Each CommitID is attributed to preserve, during the loading of the updates into the AI, the sequence order in which the modifications have been actually committed in the MF. This guarantees that the updates are performed in the same sequence order in both repositories.

ModifID's and CommitID's are hold and managed from a logistic table or LT (360) associated with the MF.

In both repositories data records are manipulated with a defined level of granularity. The master file (MF) contains the history of changes. It is organized by 'MFkey' (312). Each MFkey comprises a meaningful minimum set of data. For data retrieval, the active image (AI) is organized by 'AIkey' (332). An AIkey record generally includes a set of MFkey records. This is the meaningful minimum set of data that can be requested and fetched (235) from the AI by the end-users of the database.

Figure 4:
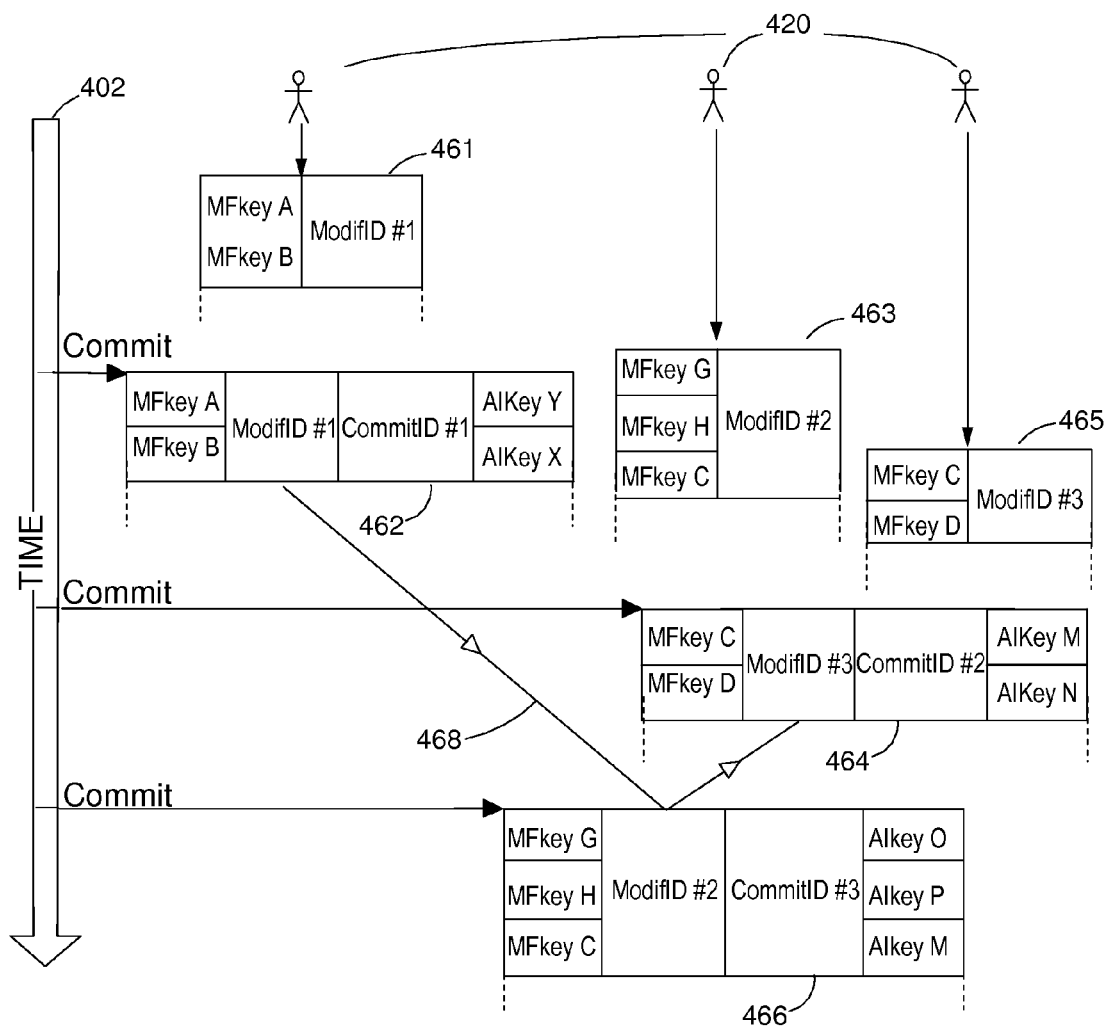
FIG. 4 discusses the overall operation of the database system that makes use of a modification identifier and of a commit identifier to propagate data from the master file to the active image.

FIG. 4 illustrates through an example the use of the identifiers (ModifID's and CommitID's) and keys (MFkey's and AIkey's) allowing a continuous acquisition of the updates.

In this example three updates are triggered by data suppliers (420) of the database. As a function of time (402) the updates are successively given three ModifID's by the logistic table shown in FIG. 3. Each update identified by a unique ModifID may involve a variable numbers of different records or MFkey's (461, 463 and 465).

When updates are committed by the MF repository they are attributed a unique CommitID as shown (462, 464 and 466). Depending on the execution time of the various processes involved, the CommitID's may not be necessarily attributed in the same order as the ModifID's. Hence, the loads into the active image are done in the order defined by the CommitID's so that the ModifID #3, in this example, is loaded into the AI prior to the ModifID #2 (468). The associated AIkey's included at commit time define the corresponding granularity elements of the AI.

Figure 5A:
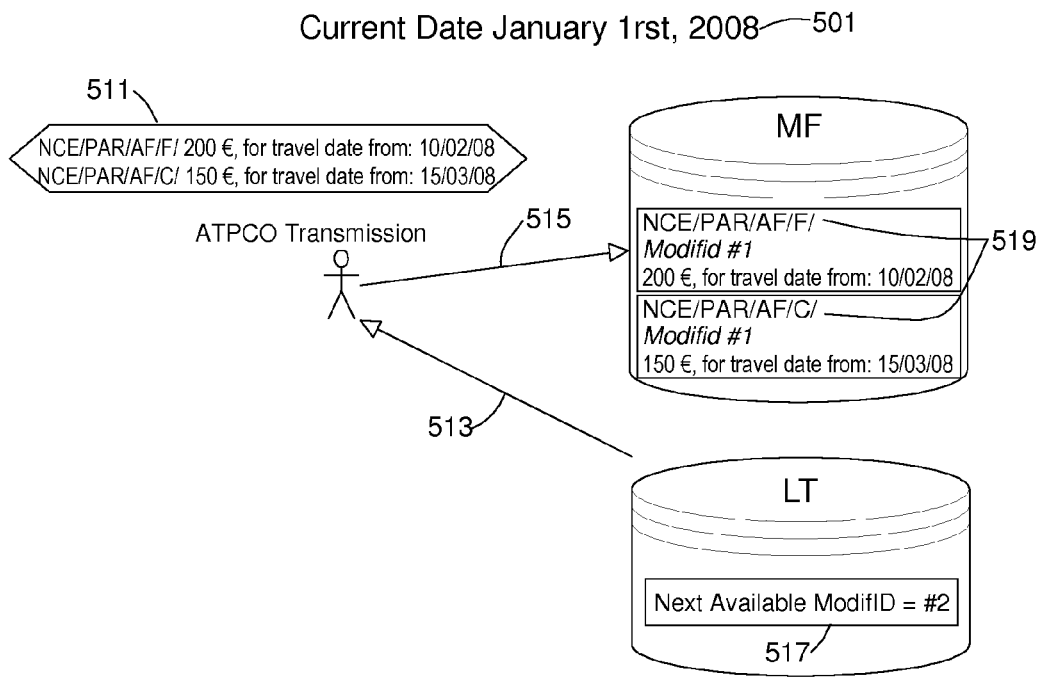

FIG. 5a to 5x show a series of examples that further illustrate the use of the identifiers to allow the concurrent updating of the MF and the multi-instance processing of the loads into the AI.

In FIG. 5a two new fares (511) are transmitted by a fare data provider, i.e., ATPCO in this case. Then, logistic table provides a first modification identifier (513) so that the next one to become available is ModifID #2 (517). The two new fares identified by the same identifier, i.e.: ModifID #1 are entered into the master file (515). They correspond to the two MFkey's: NCE/PAR/AF/F and NCE/PAR/AF/C (519).

Figure 5B:
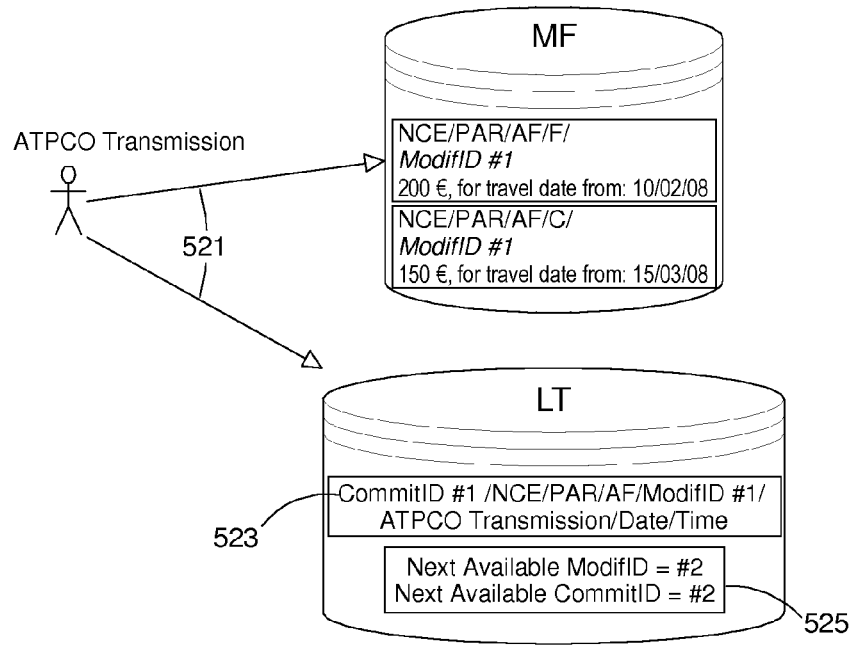

FIG. 5b shows what happens when database transaction is committed (521). A first commit identifier is attributed (523) by the logistic table (LT) which refers to the two MFkey's mentioned above corresponding to the ModifID #1. Hence, the next available commit identifier becomes CommitID #2 (525)

Figure 5C:
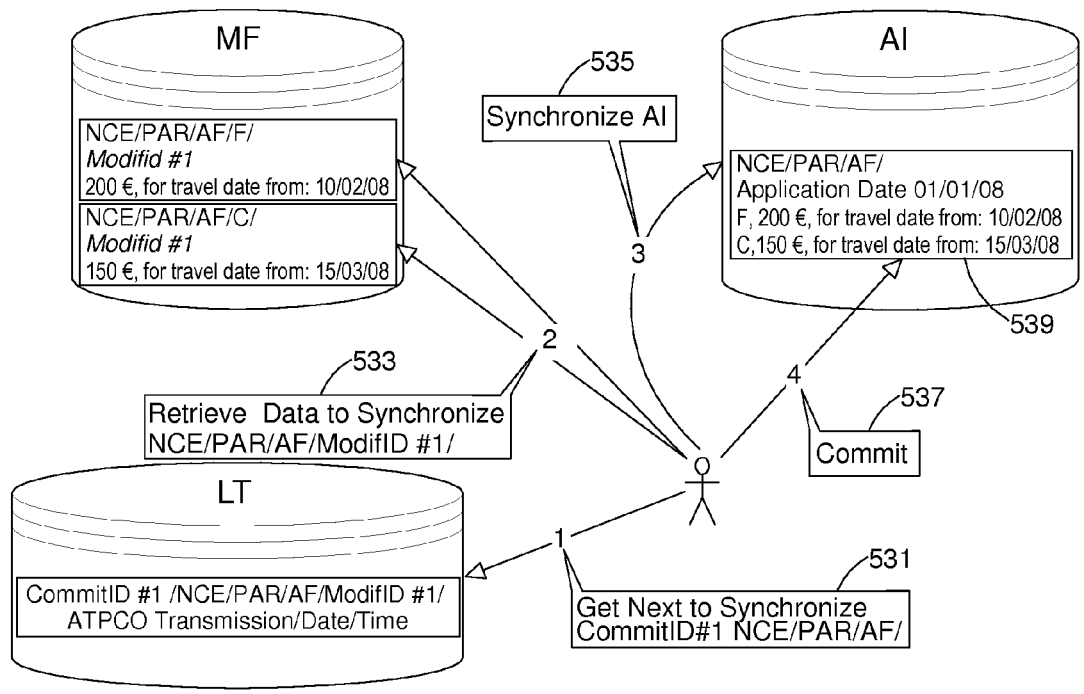

FIG. 5c illustrates how the active image is synchronized so that the end-users can start seeing the new transmitted fares. From the LT, a commit identifier is pending (531) which triggers the retrieval (533) of the fares identified by the modification identifier (ModifID #1) associated with the pending commit identifier (CommitID #1). When the two MFkey's are retrieved they are loaded into the AI so that MF and AI are now synchronized (535). When the AI transaction is in turn committed (537) the new transmitted fares become available to the end-users of the database under the form of a single AIkey (539).

The operations described by FIG. 5a to FIG. 5c have all taken place on a same date (501) in a short time interval.

Figure 5D:
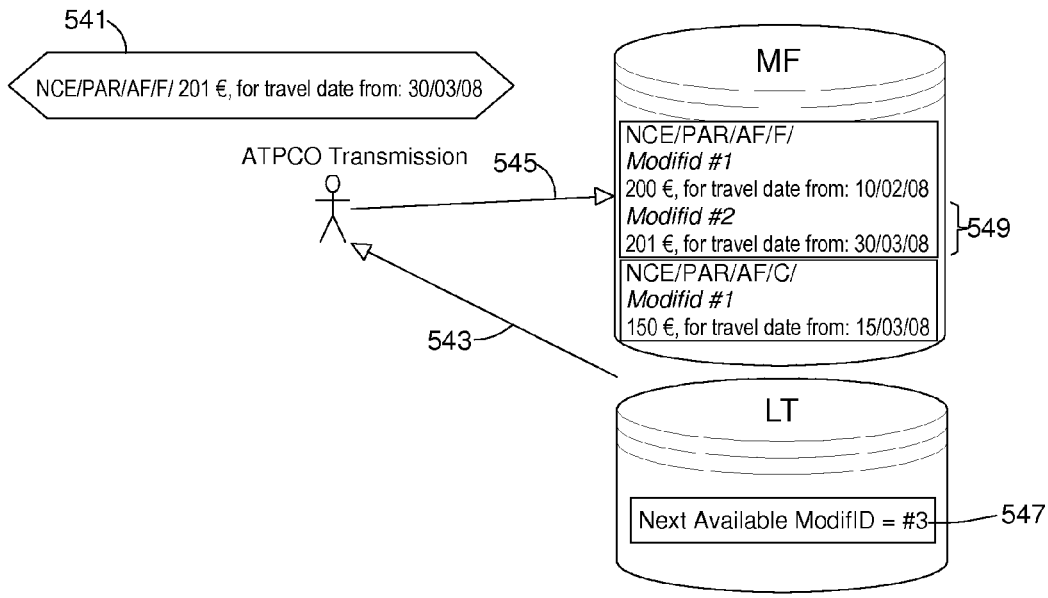

FIG. 5d and the two following ones describe the integration of a further fare (541) later received (502). As in previous case the new received fare is first attributed (543) a unique modification identifier (ModifID #2) before it is entered in the MF (545). Because the new fare refers to an existing MFkey, this key is updated as shown (549) to include the new fare item. The next available modification identifier is now ModifID #3 (547).

Figure 5E:
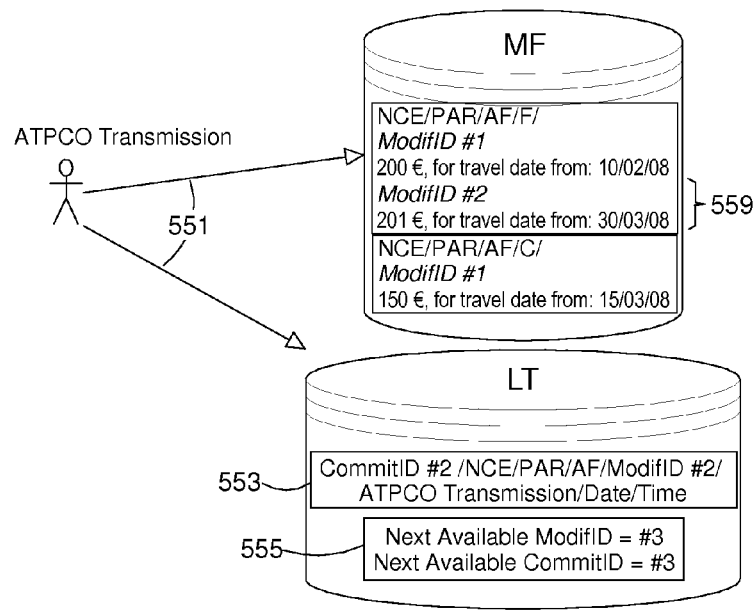

In FIG. 5e, when database transaction is committed (551), the next commit identifier (CommitID #2) is attributed (553) by the LT. The updated MFkey now include modifications corresponding to the ModifID #1 and the ModifID#2 (559). Hence, the next available commit identifier becomes CommitID#3 (559).

Figure 5F:
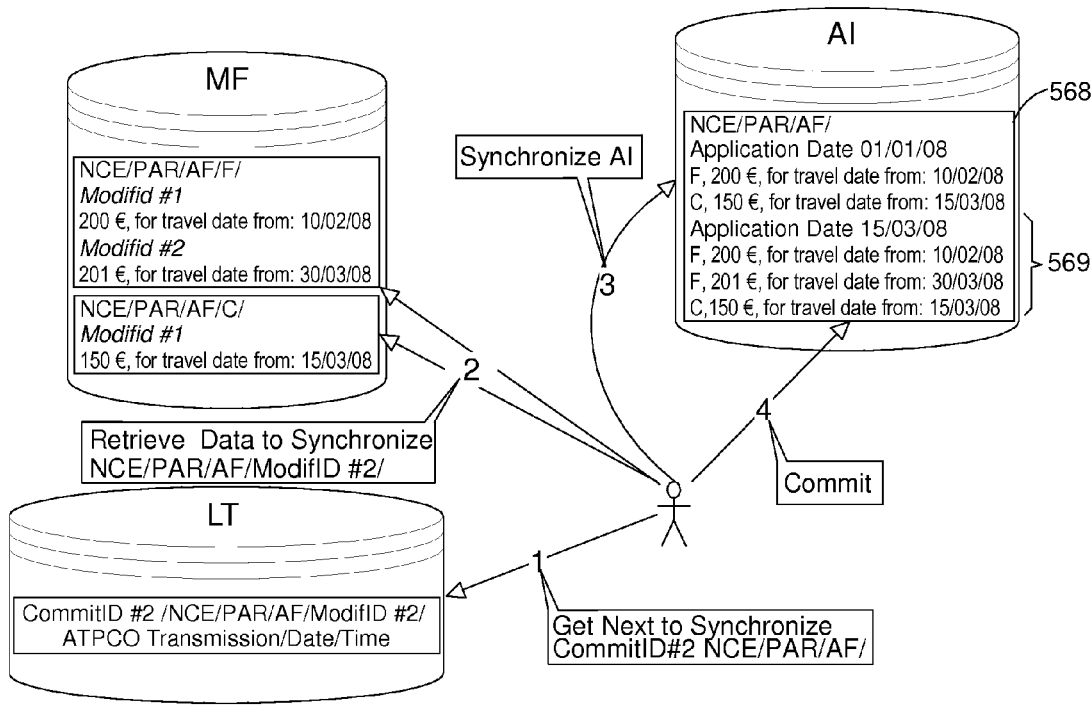

FIG. 5f is similar to FIG. 5c. The end result in this case is that the AIkey NCE/PAR/AF/ (568) now include also the new loaded fares with the current application date of 15/03/08 (569).

Figure 5G:
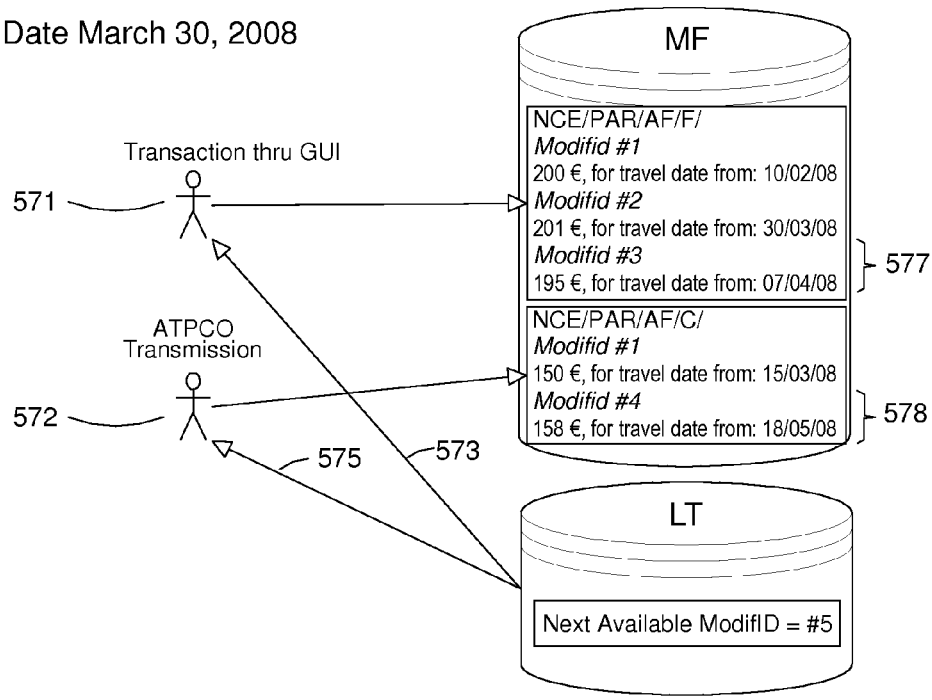

Examples continue with FIG. 5g where two fare providers are later updating concurrently the MF (current date is then 30/03/2008). As mentioned earlier, for databases of airline fares a source of fares is the transmission by ATPCO (572). Fares can also be entered directly through a dedicated GUI by an authorized operator of the database (571). In this particular example transaction through the GUI is first attributed the ModifID#3 (573) and the ATPCO transmission the ModifID #4 (575). The corresponding updates appear respectively in the NCE/PAR/AF/F/ MFkey (577) and in the NCE/PAR/AF/C/ MFkey (578).

Figure 5H:
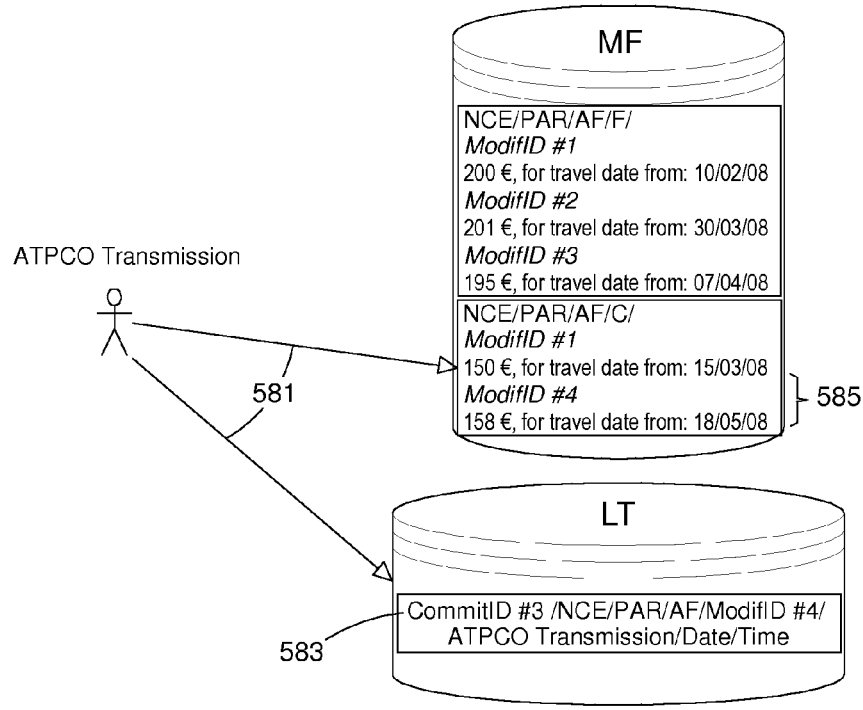

As shown in FIG. 5h ATPCO is first committed (581) with CommitID #3 (583) attributed by the LT in relation with ModifID #3 (585) while the other transaction, through the GUI, has not completed yet.

Figure 5I:
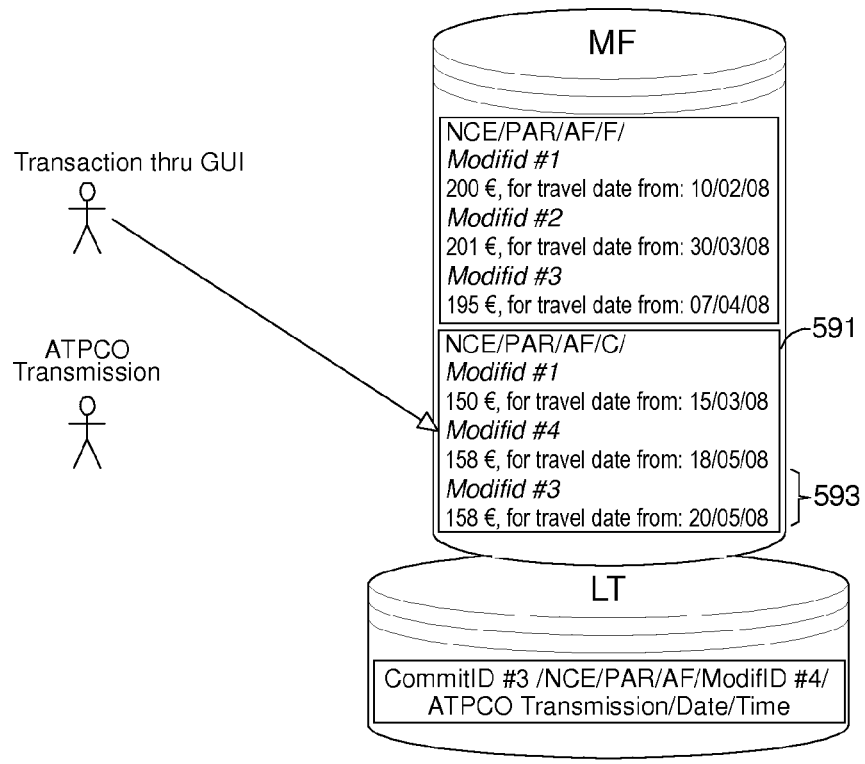

FIG. 5i shows a further update performed through the GUI. It concerns this time the NCE/PAR/AF/C/ MFkey (591) and ModifID #3 (593) that was previously attributed to the fare provider using the GUI interface.

Figure 5J:
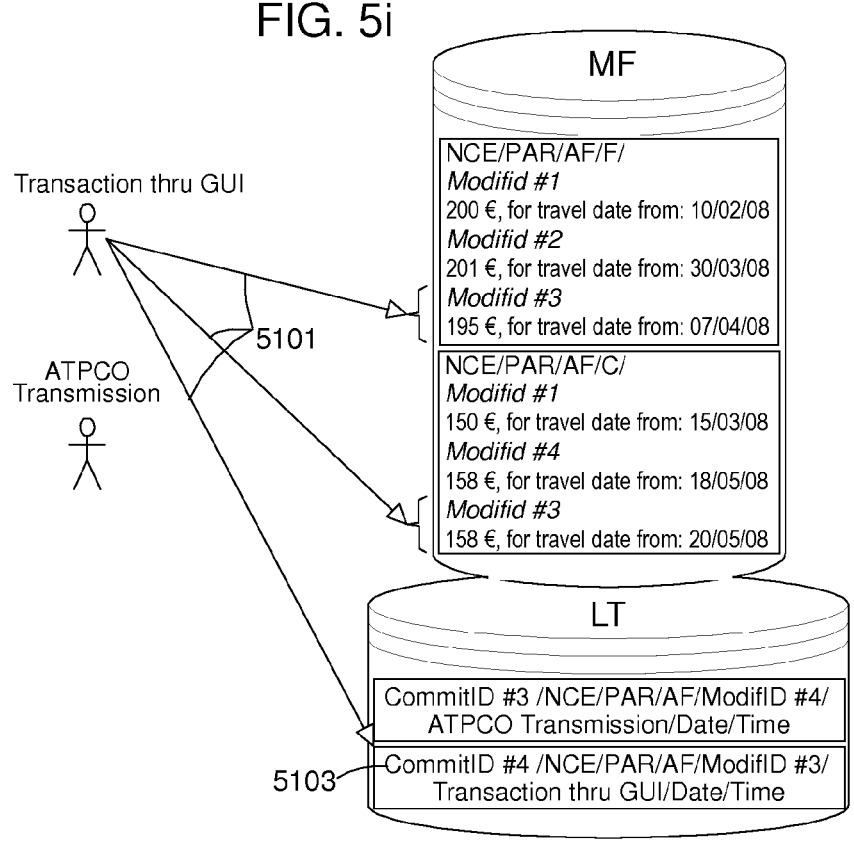

FIG. 5j shows the commitment phase of the updates (5101) where the CommitID #4 (5103) is attributed to the transaction through the GUI, in relation with the ModifID #3.

Figure 5K:
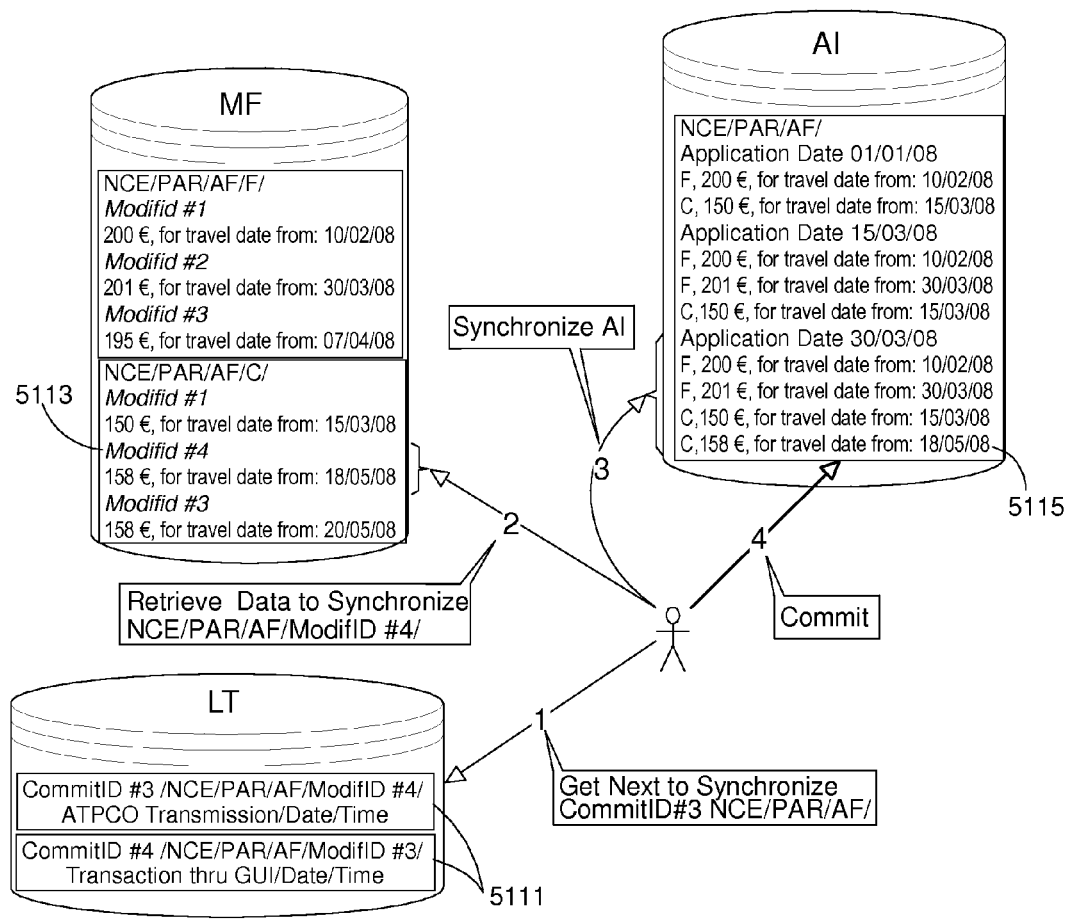
Figure 5I:
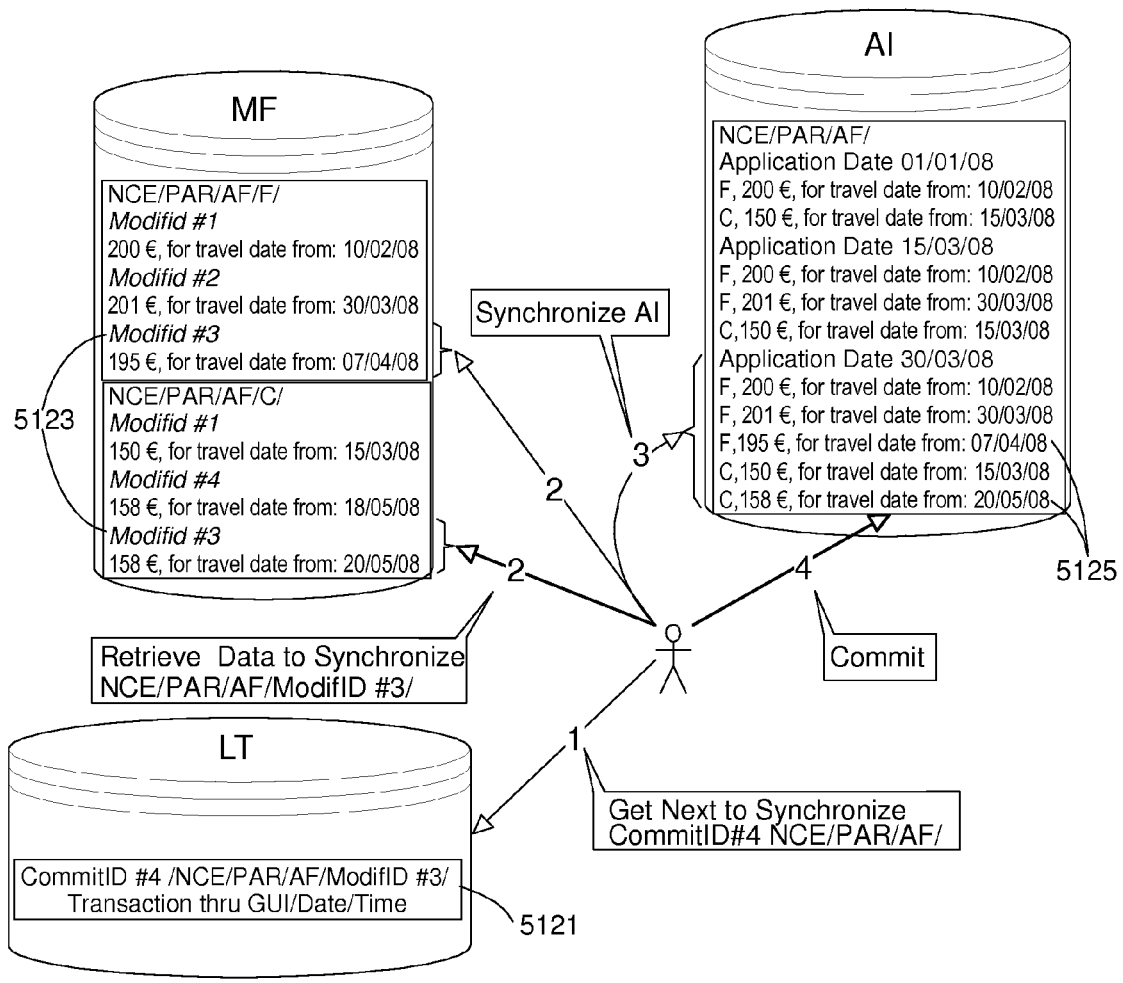

As in previous examples the AI repository is then synchronized to the MF. As shown in FIG. 5k, pending in the LT, there are at this stage two commit identifiers, namely: CommitID 3 and CommitID 4 (5111). First one is processed so that the corresponding update is retrieved from the MF, i.e.: the ModifID #4 (5113) and AI eventually synchronized (5115).

Finally, as shown in FIG. 5l, the CommitID #4 still pending in the LT (5121) is in turn processed. The two MFkey's of the corresponding modifications (5123) are retrieved from the MF and used to synchronize the AI (5125).

One will notice that the last item of the AI fare list, with an application date of 30/03/08, is overridden in this last exemplary synchronization. The travel date that was set by previous synchronization (5115) shown in FIG. 5k (from 18/05/08) is now replaced by the update done afterwards, from the transaction GUI, where the travel date has been changed to a new value, i.e.: from 20/05/08. The order in which modifications are done into the master file is actually preserved in the active image thanks to the commit identifier.

The foregoing described technique of updating a database of fares in real-time indeed allows to accommodate huge numbers of fare modifications. It is not infrequent that an organization like ATPCO needs to transfer to a GDS millions of fares along with their associated rules. With the mechanism of the invention the new fares can be continuously provided, quickly integrated and made available to the end-users of the database in an elapsed time ranging from a matter of minutes to a couple of hours for the largest fare transmissions impacting several millions of fares. This is achieved while end-users still continue to interrogate the fare database and with concurrent updates possibly performed through multiple instances (typically, a few hundreds) of the direct GUI which allows authorized operators of the fare database to also update it when it is operational.

Even though the invention has been detailed above through an example involving only fares related data it will be however apparent to the ones skilled in the art that the invention can be as well carried out to integrate and propagate in real time any sort of data.

What is claimed is:

1. A method of integrating large volumes of updates in a database system, the method comprising:
  receiving updates from data providers and an active image repository answering queries issued by end-users of the database system and storing the received updates in a master file repository of the database system;
  integrating the updates supplied by a data provider into a master file repository of the database system, the integrating step including the steps of:
  obtaining for each individual update comprised of a coherent set of data records a unique modification identifier from a logistic table of the database system;
  updating the master file repository with the coherent set of data records of each uniquely identified individual update; each individual update being stored in the master file (MF) repository in a form of one or more MF keys each comprising a meaningful minimum set of data which, in combination, serve to build the coherent set of data records, each individual update being thereby identified by a unique ModifID and involving a variable numbers of different records or MFkeys, further obtaining from the logistic table a unique commit identifier for each individual update that has been committed by the master file, the commit identifier containing an order in which each individual update is loaded in the active image repository;

loading the updates into an active image repository of the database system, the updates being stored in the active image repository in a form of one or more AI keys, each comprising a meaningful minimum set of data for the end-users of the database system, the loading step including the steps of:

retrieving from the master file repository the coherent set of data records of each uniquely identified individual update;

synchronizing the active image repository by successively propagating into the active image repository, in the order specified by the commit identifier, each individual update, completing the propagation of each individual update into the active image repository when the loading of each corresponding set of data records is committed by the active image repository;

thereby, allowing end-users of the database system to start querying immediately the propagated updates from the active image repository.

2. The method of claim 1, wherein one AI key comprises one or more MF keys.

3. The method according claim 1 wherein the commit identifiers are attributed by the logistic table in an exact same order as the individual updates have been committed by the master file repository.

4. A database system comprising:

a first and a second repository, wherein the first repository is arranged to receive updates comprised of a coherent set of data records supplied by at least one data provider and wherein the second repository is arranged to answer queries issued by end-users of the database system, wherein the first repository is organized by MF key each comprising a meaningful minimum set of data which, in combination, serve to build the coherent set of data records, each individual update being thereby identified by a unique ModifID and involving a variable numbers of different records or MFkeys, and wherein the second repository is organized by AI key each comprising a meaningful minimum set of data for the end-users of the database system, the system further comprising:

a computer programmed to provide:

a logistic table, the logistic table further including:

modification identifiers, wherein the modification identifiers are used to uniquely identify each individual update in the first repository;

commit identifiers, wherein the commit identifiers are used to control a loading of the updates into the second repository, the commit identifier containing an order in which each individual update is loaded in the second repository in order to synchronize the second repository by successively propagating into the second repository each individual update in the order specified by the commit identifier.

5. A computer program product stored on a computer readable storage medium, comprising computer readable code means for causing at least one computer to operate the method of integrating large volumes of updates in a database system according to claim 1.

* * * * *